(12) United States Patent
Seiffert et al.

(10) Patent No.: US 9,383,054 B2
(45) Date of Patent: Jul. 5, 2016

(54) CLOSURE ELEMENT FOR INTERNALLY PRESSURIZED BORES IN COMPONENTS

(75) Inventors: Pierre Seiffert, Bergdietikon (CH); Jürg Krauer, Uster (CH)

(73) Assignee: SFC KOENIG AG, Dietikon (CH)

( * ) Notice: Subject to any disclaimer, the term of this patent is extended or adjusted under 35 U.S.C. 154(b) by 160 days.

(21) Appl. No.: 13/984,703

(22) PCT Filed: Feb. 12, 2011

(86) PCT No.: PCT/EP2011/000663
§ 371 (c)(1),
(2), (4) Date: Aug. 14, 2013

(87) PCT Pub. No.: WO2012/107059
PCT Pub. Date: Aug. 16, 2012

(65) Prior Publication Data
US 2013/0312859 A1   Nov. 28, 2013

(51) Int. Cl.
*F16L 55/132* (2006.01)
*F16L 55/13* (2006.01)

(52) U.S. Cl.
CPC ............... *F16L 55/132* (2013.01); *F16L 55/13* (2013.01)

(58) Field of Classification Search
CPC ............................... F16L 55/13; F16L 55/132
USPC ............................................... 138/89; 49/506
See application file for complete search history.

(56) References Cited

U.S. PATENT DOCUMENTS

| | | |
|---|---|---|
| 2,446,661 A | 11/1944 | Murdock |
| 2,996,214 A | 8/1961 | Kemble |
| 3,257,890 A | 6/1966 | Ludwig |
| 3,333,723 A | 8/1967 | Wisman |
| 3,367,017 A | 2/1968 | Evdokimoff |
| 3,560,030 A | 2/1971 | Macks et al. |
| 3,809,273 A | 5/1974 | Lehr |
| 4,059,980 A | 11/1977 | Nance |
| 4,091,841 A | 5/1978 | Beneker et al. |
| 4,584,755 A | 4/1986 | Lundquist |

(Continued)

FOREIGN PATENT DOCUMENTS

| | | |
|---|---|---|
| AU | 2113683 A | 5/1984 |
| DE | AS 1120415 B | 12/1961 |

(Continued)

OTHER PUBLICATIONS

Machine Translation of DE 1955005.*

*Primary Examiner* — Paul R Durand
*Assistant Examiner* — Vishal Pancholi
(74) *Attorney, Agent, or Firm* — Brian Roffe

(57) ABSTRACT

The closure element includes a tensioning pin which can be tensioned and a head part of which forms a closure disc that can be spread apart by the tensioning pin. The closure disc is pressed, in the installed state, against an inner wall of the bore to be closed. When a specific tensile stress is reached, the tensioning pin is separated from the closure disc at a predetermined breaking point of the tensioning pin. The easy-to-handle tensioning pin facilitates the installation of the closure in the bore in the component. Since the closure disc is pressed against an outer counterholder during the installation process, it can be inserted into a continuously smooth bore. The limitation of the tensile stress effected by way of the predetermined breaking point also ensures that the bore is closed with a defined closing force.

20 Claims, 8 Drawing Sheets

(56) References Cited

U.S. PATENT DOCUMENTS

| | | |
|---|---|---|
| 4,765,049 A | 8/1988 | Lundquist |
| 4,820,474 A * | 4/1989 | Leslie et al. .................. 376/203 |
| 4,865,080 A | 9/1989 | Lundquist |
| 5,078,294 A | 1/1992 | Staubli |
| 5,275,299 A | 1/1994 | Konrad et al. |
| 5,494,170 A | 2/1996 | Burns |
| 5,699,923 A | 12/1997 | Burns |
| 5,944,057 A | 8/1999 | Pierce |
| 6,708,978 B2 | 3/2004 | Kagi |
| 8,936,168 B2 | 1/2015 | Wust et al. |
| 2003/0178793 A1 | 9/2003 | Denham |
| 2011/0253667 A1 | 10/2011 | Hiss |
| 2014/0224370 A1 | 8/2014 | Krauer et al. |
| 2015/0000431 A1 | 1/2015 | Krauer et al. |

FOREIGN PATENT DOCUMENTS

| | | |
|---|---|---|
| DE | 1955005 A1 | 5/1970 |
| DE | 7828248 U1 | 2/1979 |
| DE | 20202963 U1 | 9/2002 |
| GB | 1292456 A | 10/1972 |
| GB | 2094928 A | 9/1982 |
| WO | 00/37844 A1 | 6/2000 |
| WO | 2009000317 A1 | 12/2008 |
| WO | 2009056290 A2 | 5/2009 |

* cited by examiner

CLOSURE ELEMENT FOR INTERNALLY PRESSURIZED BORES IN COMPONENTS

FIELD OF THE INVENTION

The invention relates to a closure element for internally pressurised bores in components comprising a closure disc that can be inserted into the bore largely without any play and that can be spread apart by an axially applied tension and can thereby be pressed radially against the inner wall of the bore to be closed. The invention also relates to a method for installing the closure element in the bore of the component.

BACKGROUND OF THE INVENTION

Closure elements of this type are used as mass-produced items in bores that have different diameters and internal pressures. A wide range of embodiments are produced depending on the size of the bore and the strength of the effective internal pressure. Some of these embodiments are disclosed in DE AS 1 120 415 and U.S. Pat. No. 6,708,978 B2. The closures described here are made as one-part closure discs. They are therefore easier to produce than multi-part closures, such as for example the closure described in WO 2009/000317 A1. Since however the closure discs have relatively small dimensions, they are often cumbersome to handle. In addition, the closure disc must be supported against an internal counter-surface of the bore during the installation process. As a result of this the bore must be precisely graduated in order to ensure that the closure disc has the exactly intended installation depth in the installed state.

OBJECTS AND SUMMARY OF THE INVENTION

The object underlying the invention is to avoid these disadvantages and to provide a closure element of the type specified at the start which can be installed easily in a continuously smooth bore and which closes the latter reliably with a defined closing force.

According to the invention this object is achieved in that the closure disc is the head part of a tensioning pin which can be tensioned and that this tensioning pin has a predetermined breaking point at which it can be separated from the closure disc upon reaching a specific tensile stress.

The tensioning pin integrated with the closure disc facilitates the installation of the closure in the bore of the component. By tensioning the pin support of the closure disc against an inner counter-surface of the component can be dispensed with. Since the tensile effect is limited by the predetermined breaking point, is it moreover ensured that in the installed state the bore is closed with a defined closing force.

The installation of the closure element in the bore of the component is implemented according to the invention such that the closure disc is first of all introduced with the tensioning pin and the latter is then withdrawn with a clamping jaw encompassing it, the tensioning pin pressing the closure disc against an outer counter-holder in the tensile direction until it is separated from the closure disc at the predetermined breaking point upon reaching a specific tensile stress.

The method according to the invention enables fast installation of the closure with an easy-to-handle device consisting essentially of the clamping jaw housing with the tensionable clamping jaws and the easily changeable mouth piece which acts as a counter-holder.

Preferred configurations of the closure according to the invention and of the method of installing the closure form the subject matter of the dependent claims.

BRIEF DESCRIPTION OF THE DRAWINGS

In the following the invention is explained in greater detail using exemplary embodiments with reference to the schematically shown drawings. These show as follows.

DETAILED DESCRIPTION OF THE INVENTION

Figure 1:
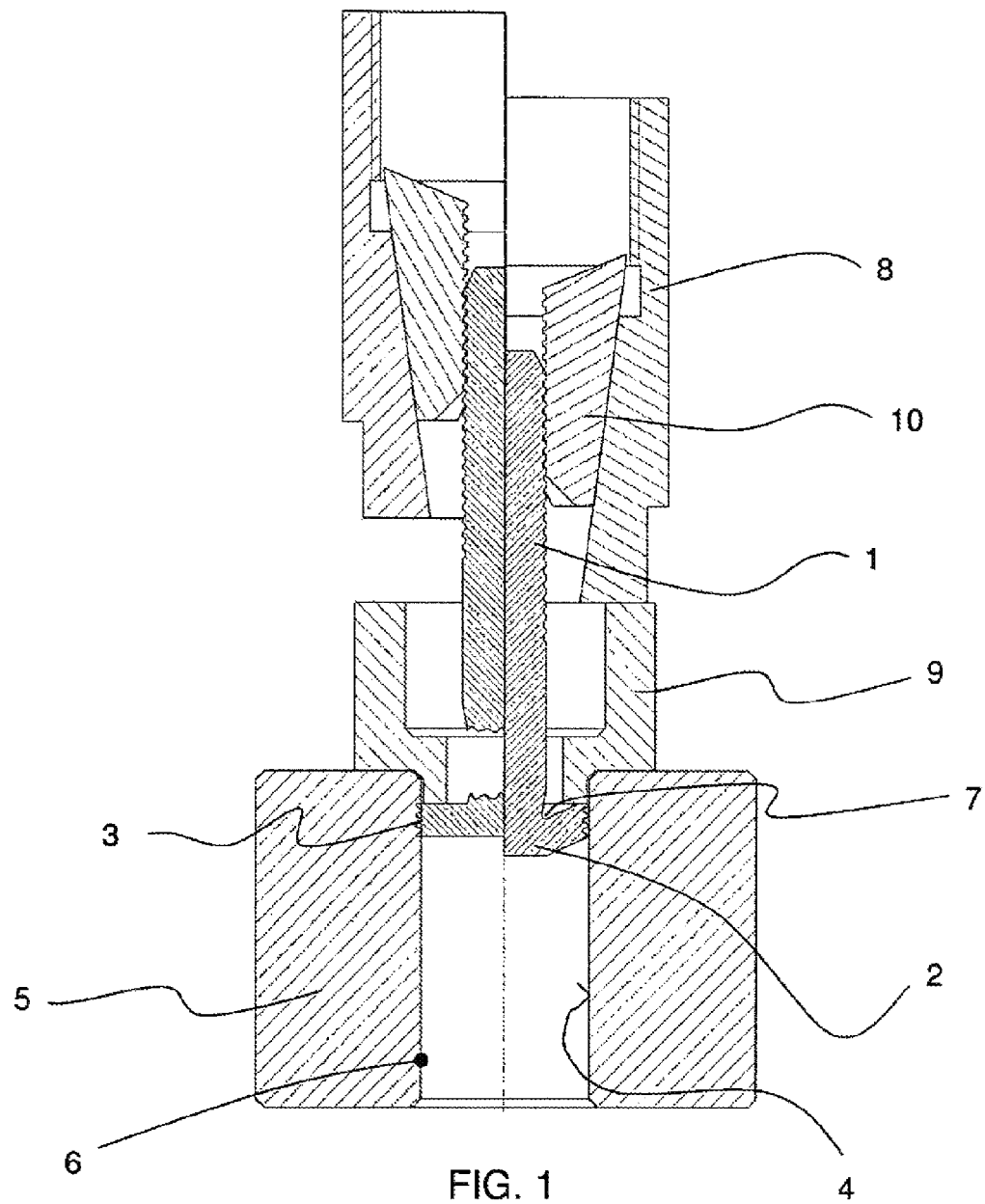
FIG. 1 shows a first embodiment of the tensioning pin according to the invention with the corresponding installation device, shown in two phases of installation.

On the right of FIG. 1 the closure element according to the invention is shown in the starting phase and on the left in the final phase of the installation process. These closure elements are primarily used in automotive, pneumatic and hydraulic applications, such as for example as for the seals of bores in vehicle engines or of bores in hydraulic or pneumatic valves etc.

The closure element comprises a tensioning pin 1 with a head part in the form of a closure disc 2 to provide the closure element with a T-shape as shown in FIG. 1 (right side). This head part has an edge-side sealing surface 3, the outer diameter of which has dimensions such that it can be introduced into the bore 4 of a component 5 largely without any play. The easy-to-handle tensioning pin 1 facilitates the installation of the closure element in the bore 4 of the component 5.

As is evident from FIG. 1, the closure disc 2 is spread apart by the tensioned tensioning pin 1 and pressed with its sealing surface 3 radially against the inner wall 6 of the bore 4 until the tensioning pin 1 is separated from the closure disc 2 upon reaching a specific tensile stress at a predetermined breaking point 7 of the tensioning pin 1. Thus, after separation of the tensioning pin 1 from the closure disc 2, the closure element has two separated parts (see FIG. 1, left side) instead of a single piece (see FIG. 1, right side). The closure disc 2 is then anchored securely in the inner wall 6 of the bore 4 and closes it with a closing force defined dependently upon the predetermined breaking stress.

The closure element according to the invention is installed with the aid of an installation device which is made up essentially of clamping jaws 10 with a clamping jaw housing 8, a withdrawal device (not detailed) and a counter-holder 9 placed on the component 5. The tensioning pin 1 is clamped securely with the clamping jaws 10 encompassing it. The easily changeable counter-holder 9 is constructed such that it projects more or less deeply into the bore 4 of the structure. In this way the installation depth of the closure can be specified from case to case. Since the tensioning pin 1 is tensioned, the counter-holder 9 is positioned behind the closure disc 2. It is therefore possible to provide the bore 4 with a continuously smooth inner surface.

Within the framework of the invention the counter-holder can also be in the form of a bush pressed into the bore or be formed by means of a narrowing of the bore.

Figure 2:
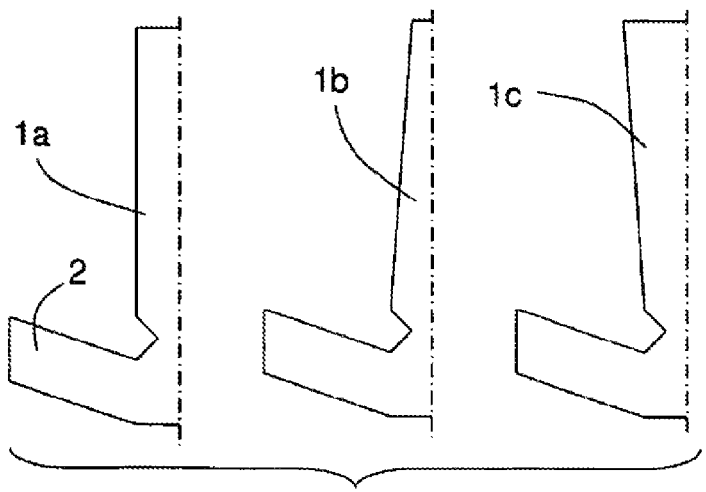
FIG. 2 shows different embodiments of the tensioning pin from FIG. 1.

FIG. 2 to FIG. 20 show further possible embodiments of the closure element according to the invention and of the corresponding installation device. In versions 1a to 1c according to FIG. 2 the tensioning pin is cylindrical or conical in form, and it can also be prismatic.

Figure 3:
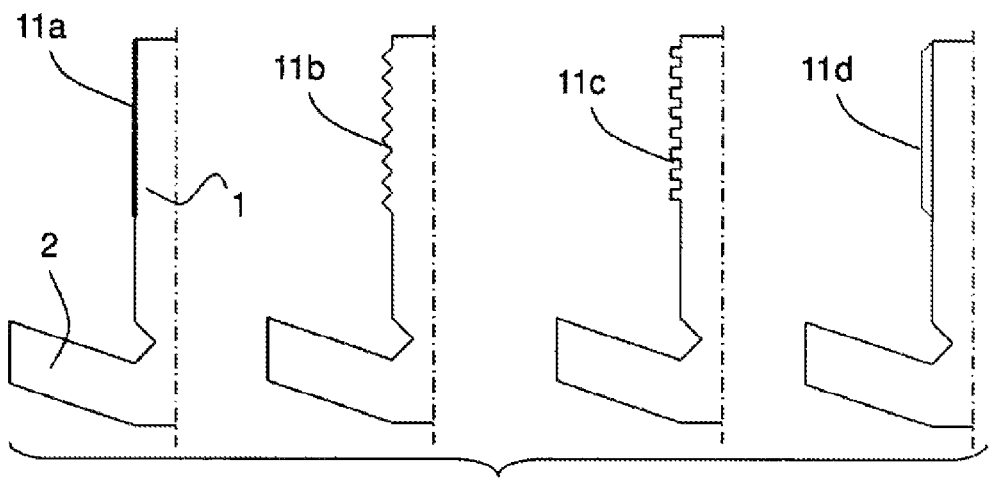
FIG. 3 shows different embodiments of the lateral surface of the tensioning pin from FIG. 1.

As is evident from FIG. 3, all or part of the tensioning pin can, moreover, have a roughened, serrated, fluted lateral surface 11a to 11d, or a lateral surface provided with a thread, to which the clamping jaws 10 can clamp securely with form or force closure. In the versions according to FIG. 13 the fluting or serrations are introduced by the clamping jaws 10a and 10b of the mouth piece formed in one or more parts.

Figure 4:
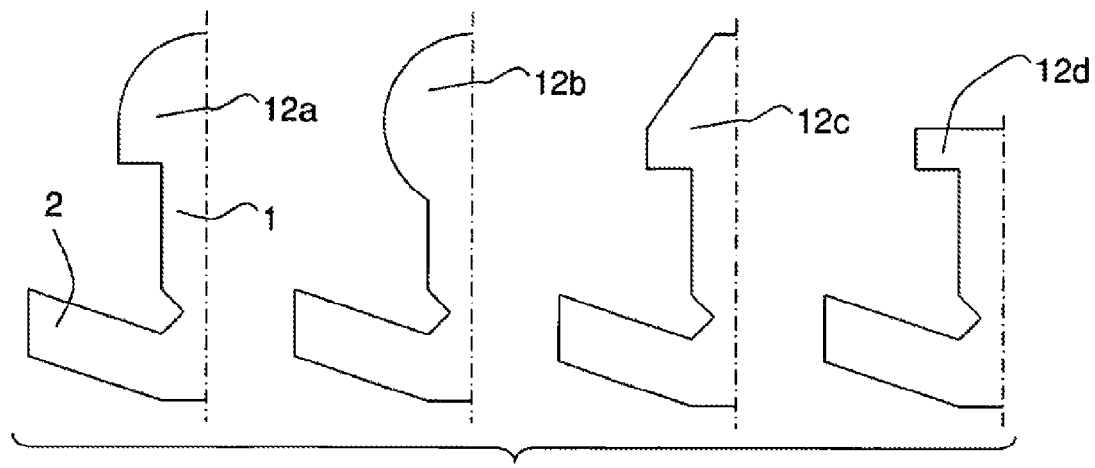
FIG. 4 shows different embodiments of the tensioning pin from FIG. 1 with a face-side extension.

In cases where high tensile forces are acting on the tensioning pin 1 or, for the purpose of providing a shorter structure, it is advantageous for reliably entraining the pin if it is provided with an extension 12a to 12d according to FIG. 4 on the end facing away from the closure disc.

Figure 5:
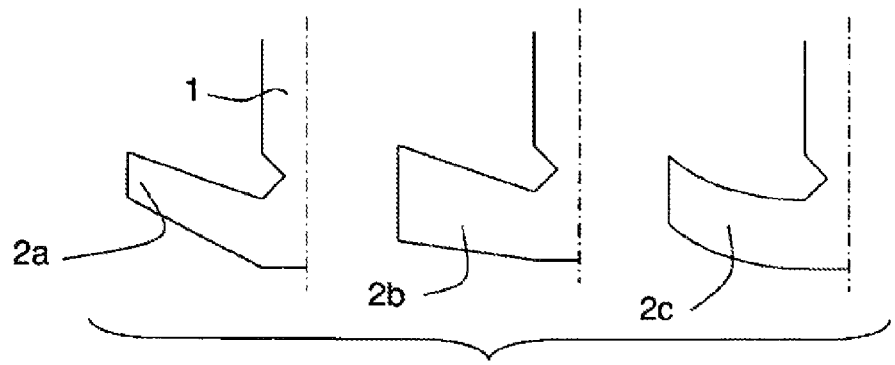
FIG. 5 shows different embodiments of the closure disc from FIG. 1.

In versions 2a to 2c according to FIG. 5 the closure disc 2 is slightly conical or spherical in form.

Figure 6:
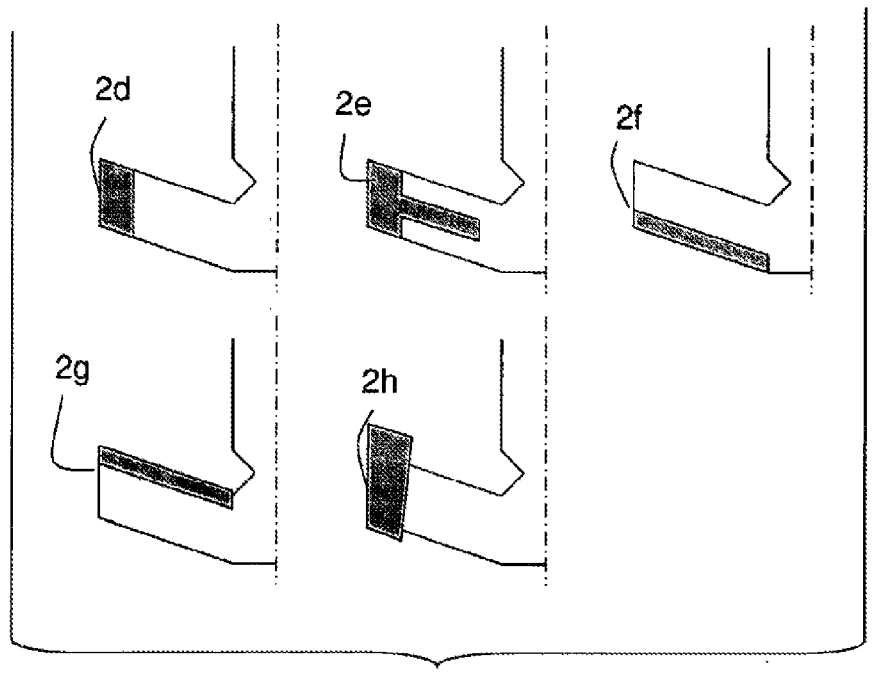
FIG. 6 shows different multi-part embodiments of the closure disc from FIG. 1.

In versions 2d to 2h according to FIG. 6 the closure disc 2 is formed in a number of parts.

Figure 7:
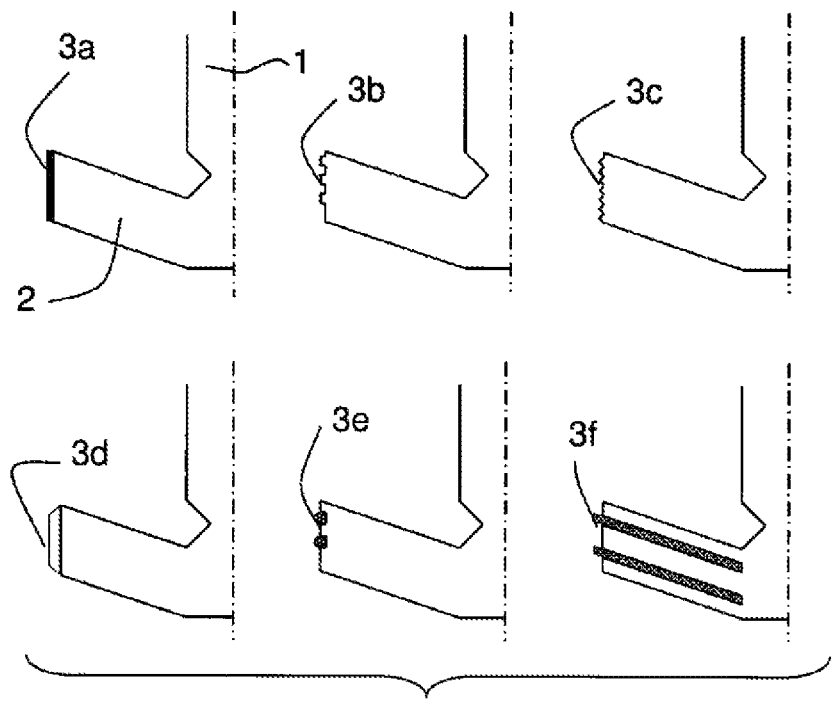
FIG. 7 shows different embodiments of the sealing surface of the closure disc from FIG. 1.
Figure 8:
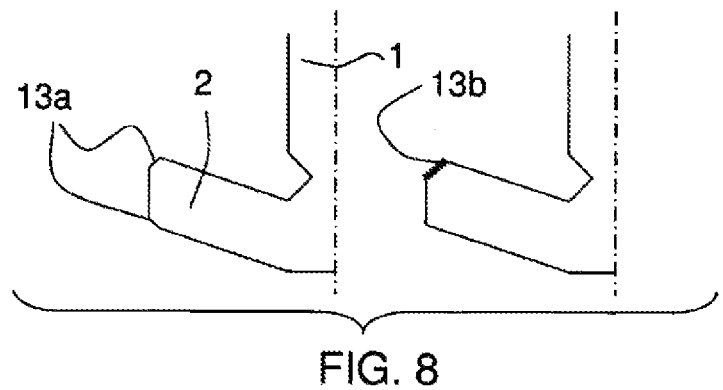
FIG. 8 shows different embodiments of the closure disc from FIG. 1 with machined sealing edges.

In the version according to FIG. 7 it has on the edge side a coated, roughened, fluted, serrated sealing surface 3a to 3f or a sealing surface provided with a thread or a sealing element, which guarantees secure anchoring of the closure disc. It is also advantageous in this context if at least the edge of the sealing surface lying on the outside is bevelled and optionally provided with an anti-sip machined surface according to versions 13a, 13b in FIG. 7. The sealing surface 3 itself is preferably cylindrical in form.

Figure 9:
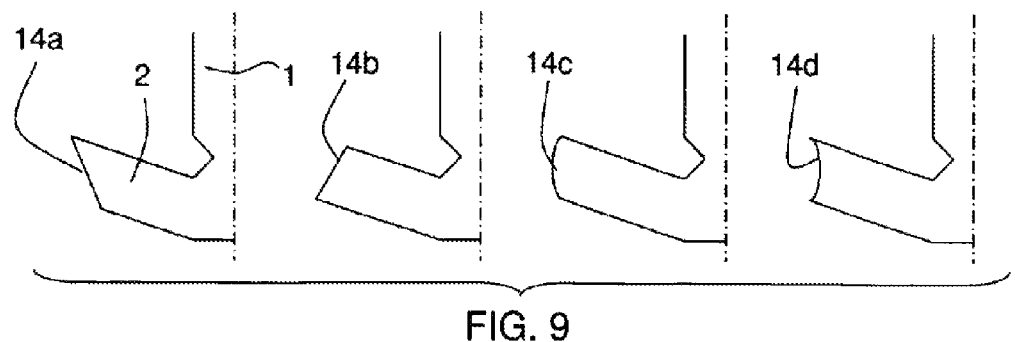
FIG. 9 shows different embodiments of the closure disc from FIG. 1 with different geometries of the sealing surface.

According to versions 14a to 14d in FIG. 9 it can, however, also be provided with a conical or concave or convex shape, for example for installation in bores that are not cylindrical in shape.

Figure 10:
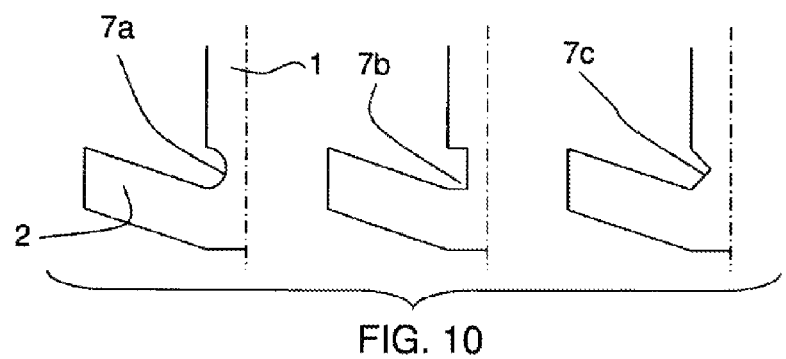
FIG. 10 shows different embodiments of the predetermined breaking point from FIG. 1.
Figure 11:
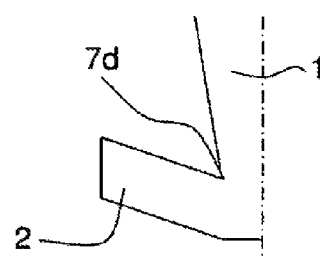
FIG. 11 shows an embodiment of the predetermined breaking point for conical tensioning pins.

The predetermined breaking point 7 of the tensioning pin 1 is in the form of a groove or notch in versions 7a to 7c according to FIG. 10. With slightly conical tensioning pins it can be formed by its edge 7d abutting against the closure disc 2 according to FIG. 11.

Figure 12:
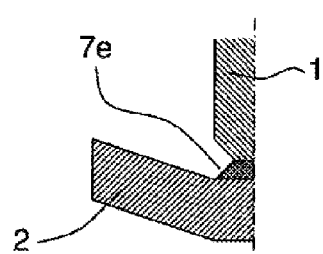
FIG. 12 shows a further embodiment of the predetermined breaking point.

In the version according to FIG. 12 the tensioning pin 1 and the closure disc 2 are produced as individual parts securely connected to one another at the predetermined breaking point 7e.

Figure 14:
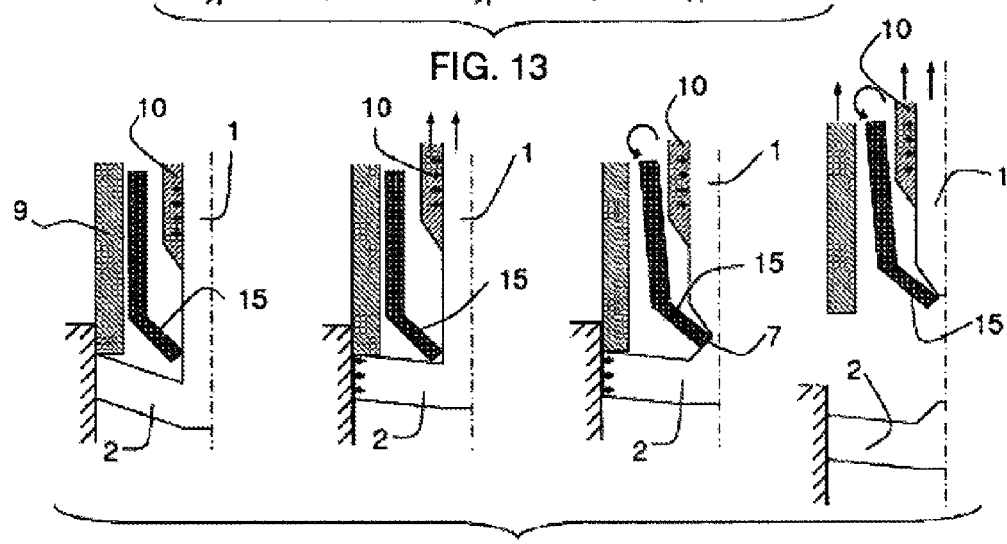
FIG. 14 shows a second version of the installation device from FIG. 1 with a cutting or stamping tool for producing the predetermined breaking point.

In the version according to FIG. 14 the predetermined breaking point 7 is introduced with a cutting or stamping tool 15 integrated in the clamping jaw housing 8 during the installation process.

Figure 15:
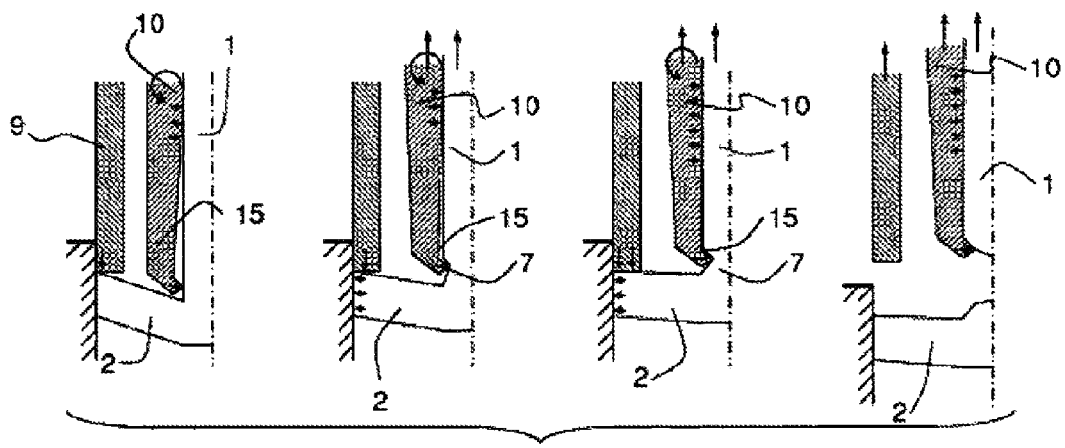
FIG. 15 shows a third version of the installation device from FIG. 1 with a cutting or stamping tool integrated into the clamping jaws.

In the version according to FIG. 15 the predetermined breaking point is also introduced during the installation process, in this case the cutting or stamping tool 15 being integrated onto the clamping jaws 10.

Figure 16:
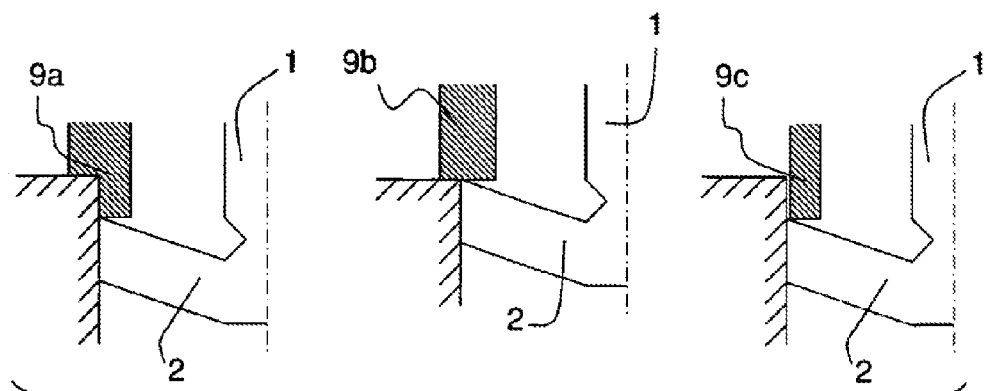
FIG. 16 shows three versions of the counter-holder from FIG. 1.

As shown in FIG. 16, the counter-holder can be graduated in accordance with version 9a, the installation depth of the closure disc 2 being determined by the depth of the graduation. In version 9b the counter-holder has a level supporting surface, and the closure disc 2 lies flush with the outer surface of the component. In version 9c the counter-holder has approximately the diameter of the bore and the closure disc can be installed at any depth.

Figure 17:
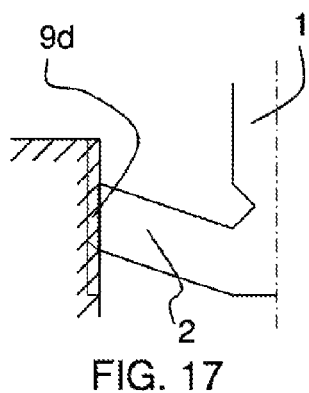
FIG. 17 shows a further embodiment of the counter-holder as a threaded part.

In version 9d according to FIG. 17 a thread arranged in the component and into which the closure disc 2 is screwed serves as the counter-holder. This enables infinite setting of the insertion depth of the closure.

Figure 13:
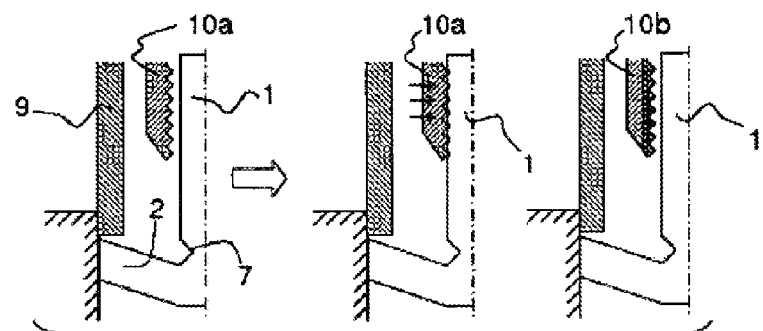
FIG. 13 shows a first version of the installation device from FIG. 1 with clamping jaws gripping the tensioning pin securely.

In the versions according to FIG. 13 to FIG. 15 the counter-holder 9 is integrated into the mouth piece of the installation device. The counter-holder 9 could also be formed as an individual part however.

The closure element can also be in the form of a retaining element. Possible versions are illustrated in FIG. 18 and FIG. 19.

Figure 18:
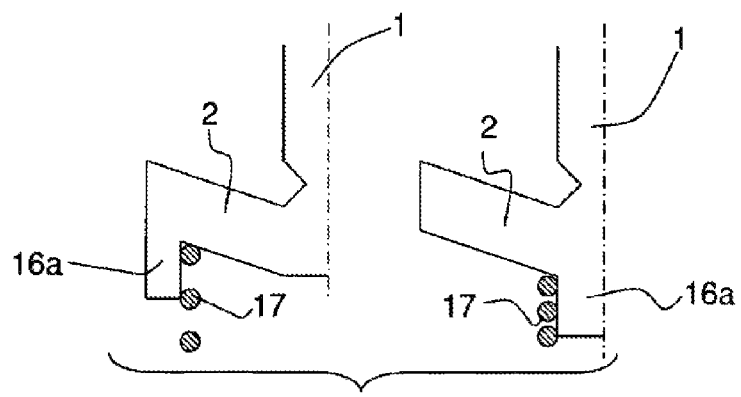
FIG. 18 shows two versions of the tensioning pin from FIG. 1 with carrying elements for a power spring.

In the versions according to FIG. 18 the closure disc 2 is equipped on the lower side with retaining means 16a, 16b for a power spring 17.

Figure 19:
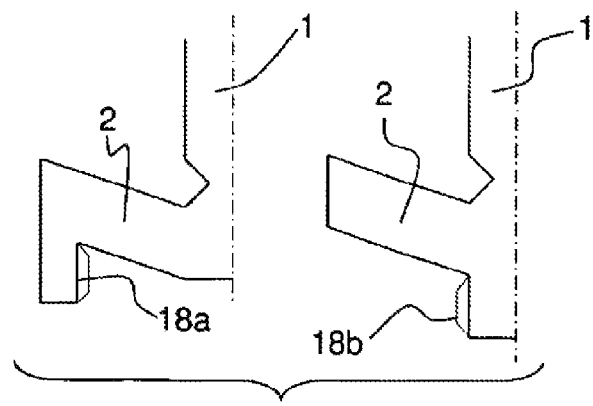
FIG. 19 shows two further versions of the tensioning pin from FIG. 1 with threads for screwing on an additional component.

In the versions according to FIG. 19 it has on the lower side a thread 18a, 18b onto which a further component can be screwed.

Figure 20:
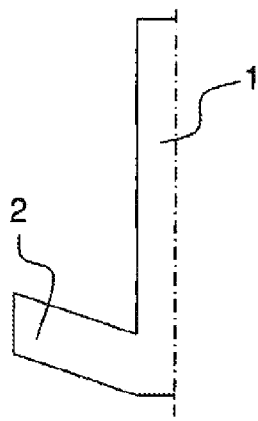
FIG. 20 shows a further version of the closure element made as a retaining element without a predetermined breaking point.

In the version according to FIG. 20 the tensioning pin 1 is not pulled off by the sealing disc 2 during installation and any retaining functions can be fulfilled. For example, it could also be provided with a thread.

Figure 21:
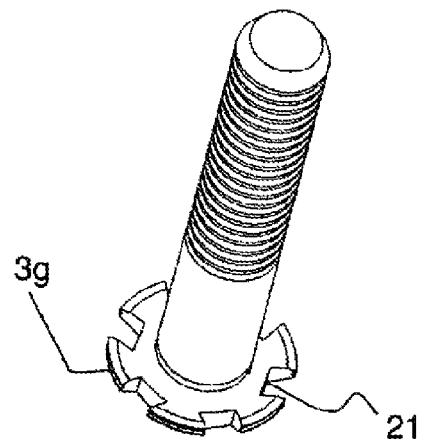
FIG. 21 shows a further version of a closure element in a perspective view.

In the closure element according to FIG. 21 one or—as shown—a number of openings 21 are provided on the closure disc with a sealing surface 3g. This type of closure element could be used in a bore in a valve or similar wherein the closure element allows a medium to pass through but, for example, retains a valve part that can be moved within the bore.

The closure element according to the invention can be produced either from metal, in particular aluminium or stainless steel, or plastic, machining processes, cold or hot forming processes and injection moulding processes being possible as methods of manufacture.

The invention claimed is:

1. A closure element for bores in components, comprising:
    a tensioning pin; and
    a closure disc forming a head part of the tensioning pin and being initially integrated with the tensioning pin, the closure disc being configured to be insertable into the bore while integrated with the tensioning pin, the tensioning pin and the closure disc being configured to cause, after insertion of the closure disc into the bore and while the closure disc is integrated with the tensioning pin, application of tension to the tensioning pin in an axial direction to result in pressing of the closure disc radially against an inner wall of the bore, the closure element including a breaking point between the tensioning pin and the closure disc at which the tensioning pin separates from the closure disc when the application of tension to the tensioning pin exceeds a specific tensile stress to cause, after the closure disc is anchored in the bore, separation of the tensioning pin from the closure disc and thus only the closure disc of the closure element to remain in the bore, wherein the tensioning pin and the closure disc form a single piece prior to and during insertion of the closure disc into the bore until separation of the tensioning pin from the closure disc.

2. The closure element according to claim 1, wherein the tensioning pin is provided with an elongate part on an opposite side of the breaking point from the closure disc that has a peripheral surface that has been at least partially chemically or mechanically processed to result in the peripheral surface being roughened, serrated, fluted or provided with a thread.

3. The closure element according to claim 1, wherein the tensioning pin is provided with an elongate part on an opposite side of the breaking point from the closure disc that has an extension for withdrawing the tensioning pin, the extension projecting outward from a remaining portion of the elongate part of the tensioning pin.

4. The closure element according to claim 1, wherein a surface of the closure disc facing away from an elongate part of the tensioning pin has a conical or spherical shape.

5. The closure element according to claim 1, wherein the closure disc has on an edge side facing radially outward, a coated, roughened, fluted or serrated sealing surface or a sealing surface provided with a thread or a sealing element, the sealing surface being configured to contact the inner wall of the bore when the closure disc is inserted into the bore.

6. The closure element according to claim 1, wherein at least an edge lying on an outside of a sealing surface is bevelled and may be provided with an anti-slip surface.

7. The closure element according to claim 1, wherein the closure disc is provided on an edge side facing radially outward with a conical, concave or convex sealing surface.

8. The closure element according to claim 1, wherein the breaking point is in the form of a groove or a notch.

9. The closure element according to claim 1, wherein the tensioning pin has an elongate part that is slightly conical tapering inward in a direction toward the breaking point and the breaking point is formed by a face edge of the elongate part of the tensioning pin abutting against the closure disc.

10. The closure element according to claim 1, wherein the closure element is in the form of a retaining element, the closure disc is provided on a lower side with retaining means for a power spring projecting into the bore or with a thread projecting axially into the bore.

11. The closure element according to claim 1, wherein the tensioning pin has a cylindrical or a slightly conical peripheral surface, the closure element having a T-shape prior to and during insertion of the closure disc into the bore until separation of the tensioning pin from the closure disc.

12. A method for installing the closure element according to claim 1 in the component, comprising:

introducing the closure disc while integrated with the tensioning pin into the bore of the component by applying tension to the tensioning pin in the axial direction and such that an outer circumferential sealing surface of the closure disc is in contact with the inner wall of the bore;

positioning a counter-holder above the closure disc such that tension applied to the tensioning pin in the axial direction causes the closure disc to press against the counter-holder; then maintaining or increasing a tensile force being applied to the tensioning pin to cause the closure disc to be pressed in the axial direction against the inner wall of the bore, the tensile force being maintained or increased until the tensioning pin separates from the closure disc upon reaching the specific tensile stress at the breaking point; and then withdrawing the tensioning pin with a mouth piece encompassing the tensioning pin such that the closure disc remains in the bore with its circumferential sealing surface in contact with the inner wall of the bore.

13. The method according to claim 12, further comprising producing the breaking point during the withdrawal process.

14. The method according to claim 12, further comprising:
positioning the counter-holder against the component; and pressing the closure disc against the counter-holder positioned on the component.

15. The method according to claim 12, further comprising:
providing the inner wall of the bore with an inner thread; and
screwing the closure disc into the inner thread such that the inner thread serves as the counter-holder.

16. The method according to claim 12, wherein the counter-holder is in the form of a bush pressed into the bore.

17. The method according to claim 12, wherein the counter-holder is formed by means of a narrowing in the bore.

18. A closure element for bores in components, comprising:

a tensioning pin having an elongate part and a head part in the form of a closure disc that extends radially outward from an end of the elongate part of the tensioning pin to provide the tensioning pin with a T-shape, the closure disc being a single piece having an outer circumferential sealing surface adapted to contact an inner wall of the bore, the closure disc being initially integrated with the elongate part of the tensioning, the closure disc being configured to be insertable into the bore while integrated with the elongate part of the tensioning pin, the elongate part of the tensioning pin and the closure disc being configured to cause, after insertion of the closure disc into the bore while integrated with the elongate part of the tensioning pin, application of tension to the elongate part of the tensioning pin in an axial direction to result in pressing of an outer circumferential surface of the closure disc radially against the inner wall of the bore, the closure element including a breaking point between the elongate part of the tensioning pin and the closure disc at which the elongate part of the tensioning pin separates from the closure disc when the application of tension to the elongate part of the tensioning pin exceeds a specific tensile stress to cause, after the closure disc is anchored in the bore, separation of the elongate part of the tensioning pin from the closure disc and thus only the closure disc of the closure element to remain in the bore.

19. The closure element according to claim 18, wherein the elongate part of the tensioning pin and the closure disc are formed as individual parts that are attached to one another.

20. A method for sealing a bore of a component, comprising:
   clamping an elongate part of a tensioning pin of a closure element, the tensioning pin having a closure disc extending radially outward from an end of the elongate part of the tensioning pin to provide the tensioning pin with a T-shape, the closure element including a breaking point between the elongate part of the tensioning pin and the closure disc at which the elongate part of the tensioning pin separates from the closure disc when tensile force applied to the elongate part of the tensioning pin exceeds a specific tensile stress to thereby cause separation of the elongate part of the tensioning pin from the closure disc;
   introducing the closure disc into the bore of the component such that an outer circumferential sealing surface of the closure disc is in contact with an inner wall of the bore; then
   applying tensile force to the elongate part of the tensioning pin to cause the closure disc to be pressed in the axial direction against the inner wall of the bore until the elongate part of the tensioning pin separates from the closure disc upon reaching the specific tensile stress at the breaking point; and then
   withdrawing the elongate part of the tensioning pin such that the closure disc remains in the bore with its circumferential sealing surface in contact with the inner wall of the bore.

* * * * *